CHARLES L. GRAHAM
HARLOW R. BRIGHAM
INVENTORS

BY

ATTORNEYS

United States Patent Office 3,577,334
Patented May 4, 1971

3,577,334
APPARATUS FOR ELECTROLYTIC RECOVERY OF A METAL FROM A SOLUTION
Charles L. Graham and Harlow R. Brigham, Rochester, N.Y., assignors to Eastman Kodak Company, Rochester, N.Y.
Filed Dec. 14, 1967, Ser. No. 690,621
Int. Cl. B01k 3/10; C22d 1/02, 1/12
U.S. Cl. 204—223
18 Claims

ABSTRACT OF THE DISCLOSURE

A metal is recovered from a solution in which the metal is present in ionic form by supporting a thin moving layer of the solution in contact with an electrode, impressing an electric potential across the moving layer, and mixing the solution within the layer as it travels past the electrode so as to replenish metal ions as they are depleted from immediately adjacent the electrode surface at which plating of the metal occurs. Apparatus for carrying out this method includes electrode means and a moving belt which supports the thin layer of solution in contact with the electrode means, the movement of the belt acting to ensure flow of the solution past the electrode and to simultaneously agitate the moving layer to effect mixing of the solution within the layer. The method and apparatus are of particular utility in the recovery of silver from viscous fixing solutions employed in photographic processing.

BACKGROUND OF THE INVENTION

(1) Field of the invention

This invention pertains in general to electrolysis and in particular to a method and apparatus for electrolytic recovery of a metal from a solution in which the metal is present in ionic form. More specifically, the invention concerns the art of recovering a metal from a metal-ion-containing solution by an electrolytic process in which a voltage is impressed across a pair of electrodes in contact with the solution with the result that the metal ions move to the electrode of lower potential and plate out on the electrode surface as the metal.

(2) Description of the prior art

Recovery by electrolytic techniques of a metal from a solution which contains ions of such metal is well known. In its simplest terms, the process involves immersing a pair of electrodes in the electrolytic solution and impressing across the electrodes a voltage of sufficient magnitude to effect migration of the metal ions to the cathode and deposition of the metal on the cathode surface in the form of a coherent plate which is subsequently removed. Electrolytic cells capable of accomplishing the desired recovery of the metal have been developed in diverse forms embodying a variety of principles of operation and corresponding structural variations. One important aspect in which many of the cells developed heretofore have differed pertains to the manner in which agitation of the electrolytic solution has been effected, it being well recognized that some form of agitation is essential to achieve a reasonable efficiency of recovery. Thus, apparatus heretofore proposed has accomplished the desired agitation of the electrolyte by, among other means, pumps for circulating the electrolyte at high velocities, impeller-type mixers, paddle wheels revolving in close proximity to the cathode, gas sparging, and ultrasonics. Each of these methods can be effectively employed with the electrolytes which are ordinarily encountered, i.e. aqueous solutions of a viscosity which does not differ greatly from that of water. However, these techniques are not effective for use with a high viscosity electrolyte and it is toward the objective of providing a novel electrolytic method and apparatus adapted to function effectively with such high viscosity electrolytes that this invention is directed.

SUMMARY OF THE INVENTION

The present invention comprises a novel method, and electrolytic apparatus for carrying out such method, for recovering a metal from a solution containing ions of the metal which finds particular utility in the treatment of viscous electrolytes. While this invention may be applied in any specific application involving recovery of a metal from a solution, it is specifically described herein with reference to the recovery of silver from viscous fixing solutions employed in the photographic arts.

In accordance with this invention, a metal is recovered from a viscous solution containing ions of the metal by supporting a thin layer of the solution in contact with an electrode, simultaneously moving the layer of solution past the electrode and subjecting it to agitation to effectively mix the solution, impressing an electric potential of suitable magnitude across the moving layer, and removing the metal plate which forms on the electrode surface.

The apparatus of this invention includes a pair of opposing closely spaced electrodes between which the thin layer of viscous solution is passed. In contrast with conventional electrolytic cells, the space between the electrodes is made extremely small so that the distance the metal ions must travel to reach the electrode surface on which the metal is plated out is very slight. The viscous solution is caused to pass between the closely spaced electrodes in such manner that it maintains contact with the electrodes adequate to permit current flow as a result of the electric potential which is impressed across the electrodes. To ensure flow of the solution between the closely spaced electrodes, and to effect agitation of the solution so as to replenish ions which are depleted from immediately adjacent the plating surface, an endless moving belt which is permeable to passage of the metal ions is passed between the electrodes in face-to-face relationship with the opposing electrode surfaces. The action of the moving belt promotes the flow of solution between the electrodes and at the same time effectively agitates the solution to effect the desired mixing of the solution in the direction perpendicular to the opposing electrode surfaces.

In a particular embodiment of the invention, the endless moving belt may serve as one of the electrodes as well as the means of supporting the thin layer of solution in contact with the opposing electrode.

As pointed out hereinabove, the electrolytic apparatus disclosed herein is capable of handling viscous electrolytes which cannot be successfully treated in apparatus heretofore known to the art. Thus, the apparatus of the present invention finds particular utility in the recovery of silver from the viscous fixing solutions which have been recently put into use in the photographic industry. These viscous fixing solutions, which are coated on the film or photographic paper and typically have a viscosity of several thousand centipoises, cannot be treated in conventional cells for electrolytic recovery of silver from photographic fixing solutions and for this reason are ordinarily discarded in spite of the loss of valuable silver that this entails. With the apparatus disclosed and claimed herein, however, they can be treated in an economical and efficient manner to recover a major portion of the silver contained therein and the apparatus can be readily adapted for use in either large scale processing operations where the amount of solution to be treated is very large or in small scale facilities involving the use of a single photographic processor. In view of the fact that the novel electrolytic apparatus described herein can be made very compact, it is especially valuable for use with portable photographic processing machines.

BRIEF DESCRIPTION OF THE DRAWING

The drawings illustrate preferred embodiments of the invention, with like reference characters designating corresponding parts in the different views.

DESCRIPTION OF THE PREFERRED EMBODIMENT

Figure 1:
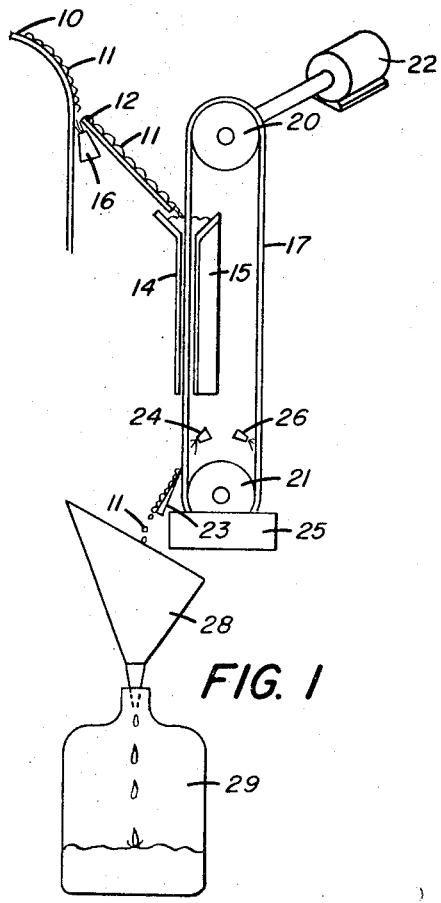
FIG. 1 is a schematic representation of the electrolytic apparatus of this invention.

Referring to FIG. 1, there is shown a moving strip of photographic film 10 which carries a coating of viscous fixing solution 11 on its surface. An air knife 16 is positioned to strip the coating from the film, whereupon it falls onto a sloping chute 12 positioned to direct the resulting stream of viscous solution to an electrolytic cell. Any suitable means of removing the viscous fix from the photographic film may be employed, an air knife as illustrated being a particularly convenient technique since it will effectively strip away the coating without damage to the film itself. Similarly, any means of directing the solution to the cell in a controlled manner, such as a conveyor or hopper, may be employed.

The electrolytic cell comprises negative electrode 14, composed of stainless steel, and positive electrode 15, composed of graphite, which is positioned close to and opposite electrode 14. Other suitable materials such as, for example, platinum or platinized titanium may be utilized in the construction of the electrodes, as is well known in the electroplating art. Electrodes 14 and 15 each define a smooth flat electrode surface over most of their length but are flared outwardly at the top to form therebetween a relatively wide mouth or hopper (designated by the numeral 18 in FIG. 3) for receiving the viscous fixing solution 11. When solution 11 is first directed to the space between the outwardly flared portions of electrodes 14 and 15, a body of solution is built up in this region and thereafter the solution is added at the same rate at which it leaves the gap at the lower end of the electrodes.

Means for impressing an electric potential across electrodes 14 and 15 are provided (as illustrated by numeral 39 in FIG. 3) in accordance with conventional electroplating practice. The current may be provided by, for example, a D.C. power supply unit including a rectifier and voltage regulator or it may be provided by a battery.

Positioned for travel between electrodes 14 and 15, in face-to-face relationship with the flat electrode surfaces, is an endless belt 17 driven in a counterclockwise direction by the combination of pulleys 20 and 21 and variable speed motor 22 which is connected to pulley 20. Endless belt 17 passes through the viscous solution within the narrow gap between the flat opposing surfaces of electrodes 14 and 15 and serves to force the solution to flow downward through the gap and also to control the speed at which any particular element of solution traverses the length of the gap. In addition, it agitates the solution to effect mixing in a direction perpendicular to the opposing surfaces of electrodes 14 and 15. As endless belt 17 exits from the lower end of the gap it passes adjacent to wiper blade 23 and air knife 24 which serve to strip off the desilvered fixing solution which is then directed into flask 29 via funnel 28. Further cleaning of belt 17 is effected by its passage through a hot wash solution contained in washing tank 25, after which belt 17 is dried by a stream of air from air nozzle 26. By this means, substantially all of the desilvered fixing solution is effectively removed from belt 17 and little or no build-up of dried solution occurs. Since contamination of the fixing solution is almost completely avoided with the apparatus of the present invention, the desilvered solution which is collected in flask 29 may be re-used following suitable replenishment in a manner known to the art. Thus, the apparatus disclosed and claimed herein not only provides for efficient recovery of silver but the economics of its operation are additionally enhanced by the fact that the fixing solution can be re-used.

Endless belt 17 is suitably constructed so that it is of the same or approximately the same width as the opposing flat surfaces of electrodes 14 and 15. It may be made of any electrically nonconductive material which is inert to the electrolyte solution and is metal-ion-permeable, i.e. will not prevent the passage of the metal ions between the electrodes. It is preferred that the belt be in the form of a mesh or screen, for example, screening made of nylon or other plastic or a woven web of fiber glass in which the strands are coated with a coating of a chemically inert polymer. The thickness of belt 17 is not critical, except that it must be of a thickness such as to provide adequate space between opposing belt and electrode surfaces to permit flow of the viscous electrolyte solution. The speed at which belt 17 is made to travel will depend upon the requirements of the particular application involved, for example, upon the amount of electrolyte solution to be treated, the dimensions of the apparatus, the temperature of operation, the percentage of the total metal present in the solution which it is desired to recover in a single pass through the cell, and so forth.

Figure 2:
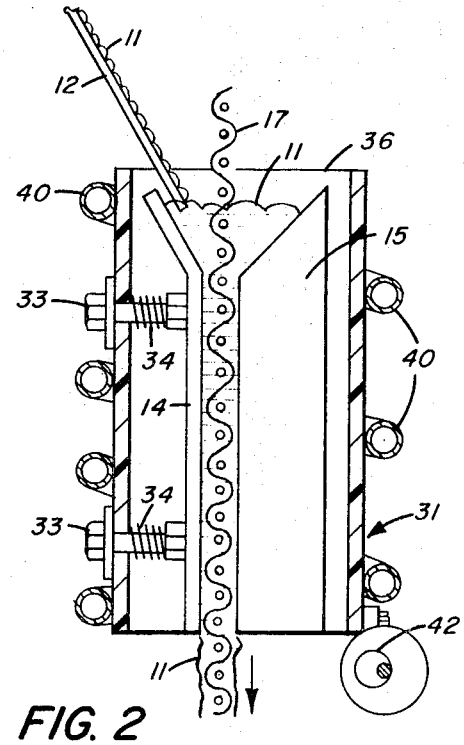
FIG. 2 is an elevation view, partially cut away, of the electrolytic apparatus of this invention.
Figure 3:
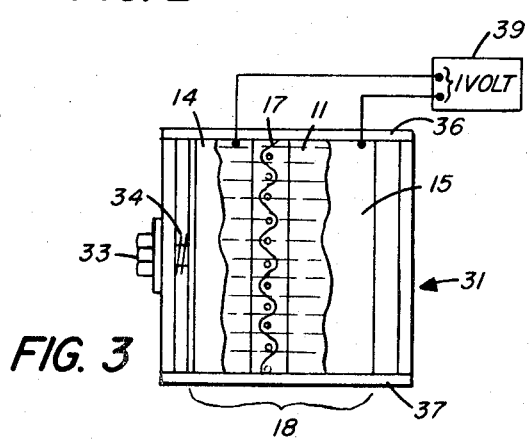
FIG. 3 is a top plan view of the electrolytic apparatus as represented in FIG. 2.

In FIGS. 2 and 3, there is illustrated a preferred embodiment of the invention wherein electrodes 14 and 15, connected to D.C. power source 39, are positioned within housing 31, with electrode 15 being fixedly attached to one wall of housing 31 and electrode 14 being mounted on adjustable bolts 33 and held by springs 34 so as to permit movement in a direction perpendicular to the face of belt 17. In this embodiment of the invention, as the metal plate builds up on electrode 14, the bolts 33 are adjusted to maintain the desired spacing between electrode 14 and belt 17 and thereby prevent contact of the belt with the metal plate. Since the metal layer which plates out will be thickest at the inlet or top end of electrode 14 and thinnest at the outlet or bottom end, by virtue of the fact that more plating occurs where the concentration of metal ions in the electrolyte solution is greatest, the adjustment of bolts 33 is preferably such as to take account of this and maintain a substantially uniform spacing between the metal plate and the moving belt along the full length of the electrode.

To facilitate control of the temperature at which the apparatus is operated, housing 31 is encircled by coil 40 adapted to carry steam, hot water, or other heating medium. There is also provided an eccentric shaft 42 which engages housing 31 and is driven by a variable speed motor (not shown) to impart vibrational motion to housing 31, and thereby to electrodes 14 and 15, so as to promote agitation and mixing of the viscous electrolyte in the narrow gap between electrodes 14 and 15. To restrict any tendency of the metal being plated out on electrode 14 to encircle the edges of belt 17, side panels 36 and 37 of housing 31 are positioned closely adjacent to the respective edges of belt 17.

The metal plated out on electrode 14 is peeled or scraped off once the desired thickness is reached or it may be removed by other suitable means which may be mechanical or chemical in nature, as is known in the art.

The novel electrolytic cell described herein may be operated in a batch, semi-continuous, or continuous manner as desired, with continuous operation requiring the provision of means for continuously or intermittently removing the metal plate from the electrode surface without terminating the operation of the cell. It is applicable to treatment of many different metal-ion-containing solutions of varying composition and viscosity. In application to viscous photographic fixing solutions, the specific composition of the fix is not important so that the invention may be employed with equal facility with, for example, basic non-hardening, acid hardening, or ammonium hypo types of fixing solutions. Similarly, the viscosity of the viscous is not critical and may, for example, vary from several hundred to several thousand centipoises at the temperature of operation. Moreover, the cell may be employed, if desired, with conventional non-viscous photographic fixing solutions although its advantages are most fully realized with viscous solutions. Good results can be obtained with fixing solutions having an initial silver concentration of from as little as one gram per liter to as much as 10 grams per liter.

In treating photographic fixing solutions, the amount of silver recovered will depend upon such variables as the contact time, the spacing between the electrodes, the temperature of operation, the viscosity of the solution, the voltage, and so forth. These variables may be adjusted for optimum performance in a particular application, as would be apparent to those skilled in the art.

With the apparatus described herein, the contact time, i.e. the time which a particular element of solution spends within the region between the opposing electrode surfaces, it determined by the length of the electrodes and the rate of travel of the moving belt. The optimum rate of travel for the belt will, of course, depend on the magnitude of the other variables but the belt should always be advanced at a rate which is at least sufficient to agitate the thin layer of solution and effect the necessary mixing of the solution within the layer as hereinbefore described. For the recovery of silver from a viscous photographic fixing solution it is generally desirable to advance the belt at such a rate that a fixed point on the belt will require several minutes to traverse the length of the electrodes.

It is a critical feature of the present invention that the electrodes are positioned in very closely spaced relationship. While the optimum spacing will depend upon the particular requirements of the specific application involved, it is apparent that the upper limit is dictated primarily by the requirement of maintaining a practical recovery rate, while the lower limit is dictated only by the practical requirements imposed by the need for sufficient space to permit travel of the belt and flow of the solution along with the requirement that bridging of metal between the electrodes and consequent shorting of the apparatus be avoided. For recovery of silver from photographic fixing solutions having a viscosity of several thousand centipoises a spacing in the range of from about 0.01 to about 0.05 inch provides good results. The thickness of the belt is not critical but must, of course, be determined in view of the spacing between the electrodes.

Viscosity of the solution and temperature of operation are, of course, inter-related variables. Greater viscosity will ordinarily result in reduced efficiency of recovery of the metal, while increase in temperature will improve recovery both due to its effect on viscosity and its effect on ionic mobility. The method of this invention can be successfully operated at room temperature but higher temperatures may be employed if desired.

In recovering silver from viscous fixing solutions, it is preferable that the cell be operated at constant voltage rather than at constant current so as to avoid the risk of the voltage rising to the point where sulfiding will occur, i.e. where sulfide ions will be removed from the fix and plate out with the silver, usually as silver sulfide. The optimum voltage will depend upon the relative magnitudes of the other variables, but will ordinarily be in the range of from about 0.5 volt to about 1 volt, lower voltages than 0.5 volt being generally insufficient to cause the silver ions to plate out at the negative electrode and voltages significantly above 1 volt ordinarily causing sulfiding to occur. In view of the fact that this voltage is impressed over a very thin layer of solution, the voltage gradient, i.e. the drop in voltage with distance, will be much higher than in the conventional cells for recovery of silver from photographic fixing solutions known heretofore in which similar voltages are employed but in which the electrodes are widely spaced, for example, at a distance of as much as several inches or more. This is a significant feature of the present invention which serves in part to distinguish it from the many different electrolytic cells heretofore proposed.

As will be apparent from the foregoing disclosure, the essential requirements of the method of this invention are (1) that a thin layer of the solution be maintained in contact with the electrode so that the distance which the metal ions must move to reach the plating surface, i.e. the electrode surface of lower potential, is minimized, and (2) that this thin layer of solution be subjected to agitation as it is moved relative to the electrode so as to effect mixing in a direction perpendicular to the electrode and thereby replenish metal ions as they are depleted from immediately adjacent the plating surface with the net result that the ions move to this surface and plate out thereon as the corresponding metal.

Consonant with the above requirements, modifications of the specific embodiments of the invention described herein can be readily effected in order to better suit a particular application. Thus, for example, the electrodes can be positioned in a horizontal rather than a vertical position, or the endless belt can pick up the viscous electrolyte solution at a point just below the electrodes and then be driven upward to convey the solution through the narrow gap between the electrodes. In a further variation the electrolytic cell can comprise a series of sets of opposing positive and negative electrodes. Continuous operation of the apparatus can be facilitated by construcing the negative electrode in the form of a moving conductive belt, rather than as a stationary electrode as illustrated herein, and then including means to continuously remove the metal plate from the belt electrode as it traverses its circular path. In such apparatus, the positive electrode would be stationary, as in the embodiment described in detail herein, and the non-conductive belt would travel within the narrow gap between the face of the positive electrode and the opposing face of the negative belt electrode to effect the required conveyance and agitation of the thin layer of electrolyte solution. Increased capacity over that obtainable with the embodiment described in detail herein can be achieved by employing a single stationary positive electrode with stationary negative electrodes positioned on both sides thereof and two endless non-conductive belts arranged so that one passes between the positive electrode and each of the respective negative electrodes. In a still further variation of the apparatus, the belt may be made electrically conductive and one of the electrodes may then be omitted, i.e. the moving belt would then serve both as an electrode and as a support for the thin layer of solution, to keep such layer in contact with the surface of the other electrode. This is most effective where the apparatus is designed for horizontal travel of the belt so that the viscous solution supports the belt as it travels over the stationary electrode. Insulating rails, composed of a material such as polytetrafluoroethylene may be mounted on the stationary electrode to aid in supporting the moving belt electrode. Many other variations and modifications will occur to those skilled in the art.

Apparatus constructed in accordance with the disclosure herein was operated to recover silver from a viscous photographic fixing solution with excellent results. The apparatus was constructed with flat, vertically disposed, parallel electrodes, eleven inches in length and two inches in width, spaced at a distance of 0.020 inch, and employed a belt with a width of two inches and a thickness of 0.017 inch. The positive electrode was composed of graphite and the negative electrode was composed of stainless steel, while the belt was a woven web of fiber glass in which the strands were coated with a polymer of vinylidene chloride. The belt was driven at variable speeds ranging from 0.1 feet per minute to 1.14 feet per minute. Voltages were varied over the range from 0.7 to 1.0 volt. Silver was satisfactorily recovered from viscous fixing solutions varying in pH from 4.25 to 8.5 and having a viscosity at room temperature of about 3500 centipoises, with initial silver concentration ranging from 1 to 10 grams per liter, over a temperature range of about 20° C. to about 50° C. The maximum percentage of silver recovery under the conditions tested was about 75 percent of the total silver in the solution recovered in a single pass through the apparatus.

The invention has been described in detail with particular reference to preferred embodiments thereof, but it will be understood that variations and modifications can be effected within the spirit and scope of the invention as described hereinabove and as defined in the appended claims.

We claim:
1. Apparatus for recovering a metal from a solution containing ions of said metal, comprising:
   (1) electrode means including first and second electrodes positioned in opposing closely spaced relationship to form a narrow gap therebetween for passage of said solution,
   (2) an electrically non-conductive belt which is permeable to passage of said metal ions arranged to pass through said gap in face-to-face relationship with the opposing surfaces of said first and second electrodes for supporting a thin layer of said solution in contact therewith,
   (3) means for driving said belt to agitate the solution within said layer and move said layer relative to said electrode means, and
   (4) means for energizing said electrode means to develop an electric potential across said layer, whereby the metal ions in said solution move to the surface of said electrode means which is of lower potential and plate out thereon as the corresponding metal.

2. Apparatus as described in claim 1 including means for removing said solution from said belt following passage through said gap.

3. Apparatus as described in claim 1 wherein the electrode which is plated is movable in a direction perpendicular to the surface on which plating occurs.

4. Apparatus as described in claim 1 including a housing enclosing said first and second electrodes comprising side panels cooperating with said first and second electrodes to contain said solution and spaced so as to closely guide the edges of said belt.

5. Apparatus as described in claim 4 including means for vibrating said housing to increase the agitation to which said solution is subjected.

6. Apparatus as described in claim 4 including heating means disposed in contact with said housing for heating said solution.

7. Apparatus for recovering silver from a viscous photographic fixing solution, comprising:
   (1) first and second electrodes positioned in opposing closely spaced relationship to form a gap of about 0.01 to about 0.05 inch therebetween for passage of said solution,
   (2) an inert, electrically non-conductive silver-ion-permeable belt arranged to pass through said gap in face-to-face relationship with the opposing surfaces of said first and second electrodes for supporting a thin layer of said solution in contact with said electrode surfaces,
   (3) means for driving said belt, and
   (4) means for energizing said first and second electrodes to develop an electric potential across said layer, whereby the silver ions in said solution move to the electrode which is of lower potential and form a silver plate thereon.

8. Apparatus as described in claim 7 including means for removing said solution from said belt following passage through said gap.

9. Apparatus as described in claim 7 wherein said electrode on which said silver plate is formed is movable in a direction perpendicular to the surface on which plating occurs.

10. Apparatus as described in claim 7 including a housing enclosing said first and second electrodes comprising side panels cooperating with said first and second electrodes to contain said solution and spaced so as to closely guide the edges of said belt.

11. Apparatus as described in claim 7 wherein said means for energizing said first and second electrodes is capable of providing a constant voltage in the range from about 0.5 volt to about 1 volt.

12. Apparatus as described in claim 7 wherein the negative electrode is composed of stainless steel.

13. Apparatus as described in claim 7 wherein the positive electrode is composed of graphite.

14. Apparatus as described in claim 7 wherein said belt is a woven web of fiber glass coated with an inert polymer.

15. Apparatus as described in claim 7 wherein said first and second electrodes are arranged so that the opposing surfaces thereof are vertically disposed, wherein the opposing surfaces of said first and second electrodes are flared outwardly at the top to thereby form a hopper for receiving said viscous solution, and wherein said belt travels downwardly within said gap at a rate such as to provide a contact time of several minutes.

16. Apparatus as described in claim 10 including means for vibrating said housing to increase the agitation to which said solution is subjected.

17. Apparatus as described in claim 10 including heating means disposed in contact with said housing for heating said solution.

18. Apparatus for recovering silver from a viscous photographic fixing solution, comprising:
   (1) a stainless steel cathode,
   (2) a graphite anode positioned close to and opposite said cathode to form a gap of about 0.01 to about 0.05 inch therebetween for passage of said solution, said anode being movable in a direction perpendicular to the opposing surface of said cathode,
   (3) an inert, electrically non-conductive, silver-ion-permeable belt arranged to pass through said gap in face-to-face relationship with the opposing surfaces of said anode and cathode for supporting a thin layer of said solution in contact with said surfaces,
   (4) means for driving said belt,
   (5) means for removing said solution from said belt following passage through said gap,
   (6) a housing enclosing said anode and cathode comprising side panels cooperating with said anode and cathode to contain said solution and spaced so as to closely guide the edges of said belt,
   (7) means for vibrating said housing to increase the agitation to which said solution is subjected,
   (8) heating means disposed in contact with said housing for heating said solution, and
   (9) means for energizing said anode and cathode capable of developing an electric potential in the range of from about 0.5 volt to about 1 volt across said layer, whereby the silver ions in said solution move to said cathode and form a silver plate thereon.

References Cited

UNITED STATES PATENTS

| | | | |
|---|---|---|---|
| 1,358,248 | 11/1920 | Sadtler | 204—273 |
| 1,316,769 | 9/1919 | Cornwell | 204—273 |
| 3,377,202 | 4/1968 | Belove | 204—28 |
| 3,081,238 | 3/1963 | Gurry | 204—28 |

JOHN H. MACK, Primary Examiner

R. L. ANDREWS, Assistant Examiner

U.S. Cl. X.R.

204—109, 222, 225, 261, 262, 263